United States Patent
Layouni et al.

(10) Patent No.: US 12,503,001 B2
(45) Date of Patent: Dec. 23, 2025

(54) ELECTRIC VEHICLE AND CHARGING STATION COMMUNICATIONS

(71) Applicant: GM Global Technology Operations LLC, Detroit, MI (US)

(72) Inventors: Mohamed A. Layouni, Fraser, MI (US); Roddi Lynn MacInnes, Bowmanville (CA); Pedro Eduardo Villanueva Pena, Toronto (CA); Kenneth C. Weber, Ajax (CA)

(73) Assignee: GM Global Technology Operations LLC, Detroit, MI (US)

( * ) Notice: Subject to any disclaimer, the term of this patent is extended or adjusted under 35 U.S.C. 154(b) by 637 days.

(21) Appl. No.: 18/059,055

(22) Filed: Nov. 28, 2022

(65) Prior Publication Data

US 2024/0174112 A1    May 30, 2024

(51) Int. Cl.
*H02J 7/00* (2006.01)
*B60L 53/65* (2019.01)
*B60L 53/66* (2019.01)

(52) U.S. Cl.
CPC .............. *B60L 53/66* (2019.02); *B60L 53/65* (2019.02)

(58) Field of Classification Search
CPC ................. B60L 53/65; B60L 53/66
USPC .............................................. 320/109; 701/22
See application file for complete search history.

(56) References Cited

U.S. PATENT DOCUMENTS

| 2013/0110296 A1* | 5/2013 | Khoo | G06Q 20/409 |
| | | | 700/286 |
| 2020/0207236 A1* | 7/2020 | Skrbic | G01R 21/1333 |

FOREIGN PATENT DOCUMENTS

| WO | WO-2021031061 A1 * | 2/2021 | ......... H04L 63/0823 |

* cited by examiner

*Primary Examiner* — Zixuan Zhou
(74) *Attorney, Agent, or Firm* — Vivacqua Crane, PLLC

(57) ABSTRACT

A vehicle charging station includes a connector adapted to connect a vehicle to the charging station, the charging station adapted to exchange information related to identification and charging requirements and capabilities, send a challenge to the vehicle, receive a response to the challenge from the vehicle, verify the response from the vehicle and store the response and the vehicle identification information within a database, wherein, the exchange of information between the vehicle and the charging station is performed within allowed duty cycle and voltage intervals such that the exchange of information between the vehicle and the charging station do not interfere with charging of the vehicle.

20 Claims, 3 Drawing Sheets

ELECTRIC VEHICLE AND CHARGING STATION COMMUNICATIONS

INTRODUCTION

The present disclosure relates to charging stations for vehicles equipped with electric propulsion systems. Specifically, Level 1 and Level 2 AC chargers that do not support Digital Communications. Vehicle manufacturers promote usage of their own branded charging stations by owners of their vehicles, and encourage this by offering rewards, warranty extensions and discounts on charging fees. Therefore, it is important for vehicle and charging station manufacturers to be able to accurately identify the vehicles using the charging stations. Such charging stations already have capability of communicating with vehicles that are being charged and collecting charging-related data such as maximum current that can be drawn, but current charging stations do not include security features to prevent unauthorized interception of data. The primary issue with current charging stations is their inability to securely identify vehicles. The reason for this is the static and predictable nature of the data being exchanged, and the fact that such data can be intercepted.

Thus, while current systems and methods achieve their intended purpose, there is a need for a new and improved charging system and method for facilitating communication between a vehicle and a charging station over analog signals using equipment that is existing and already in place, wherein such communications do not interfere with the charging process and provide added security by making exchanged data dynamic and unpredictable, thus preventing replay attacks and preventing oracle attacks on charging stations.

SUMMARY

According to several aspects of the present disclosure, a method of communication between a vehicle and a charging station includes connecting the vehicle to the charging station, exchanging, between the vehicle and the charging station, information related to identification and charging requirements and capabilities, sending, from one of the charging station and the vehicle, a challenge to the other one of the charging station and the vehicle, sending, from the other one of the charging station and the vehicle to one of the charging station and the vehicle, a response to the challenge, verifying, at one of the charging station and the vehicle, the response and storing the response and the vehicle identification information and the charging station information within a database, and wherein, the exchanging, between the vehicle and the charging station, information related to identification and charging requirements and capabilities, the sending, from the charging station, a challenge to the vehicle, and the sending, from the vehicle to the charging station, a response to the challenge are performed within allowed duty cycle durations and voltage levels such that the exchanging, between the vehicle and the charging station, information related to identification and charging requirements and capabilities, the sending, from the charging station, a challenge to the vehicle, and the sending, from the vehicle to the charging station, a response to the challenge do not interfere with charging of the vehicle.

According to another aspect, the exchanging, between the vehicle and the charging station, information related to identification and charging requirements and capabilities, the sending, from one of the charging station and the vehicle, a challenge to the other one of the charging station and the vehicle; the sending, from the other one of the charging station and the vehicle to the one of the charging station and the vehicle, a response to the challenge are performed over analog signals and then communication returns to normal operation of the analog signals.

According to another aspect, the exchanging, between the vehicle and the charging station, information related to identification and charging requirements and capabilities, the sending, from one of the charging station and the vehicle, a challenge to the other one of the charging station and the vehicle; the sending, from the other one of the charging station and the vehicle to the one of the charging station and the vehicle, a response to the challenge, are performed within a multi-duration duty cycle that supports communication from the charging station to the vehicle and are performed within a multi-level voltage from the vehicle to the charging station.

According to another aspect, the exchanging, between the vehicle and the charging station, information related to identification and charging requirements and capabilities, the sending, from one of the charging station and the vehicle, a challenge to the other one of the charging station and the vehicle; the sending, from the other one of the charging station and the vehicle to the one of the charging station and the vehicle, a response to the challenge, and the sending of the maximum allowed charging current indicator from the charging station to the vehicle are performed within a duty cycle that is at least 10% and does not exceed 50%.

According to another aspect, the duty cycle includes alternating first and second timeslots, wherein, the sending of the maximum allowed charging current indicator from the charging station to the vehicle is performed within first timeslots of the duty cycle, and wherein, the exchanging, between the vehicle and the charging station, information related to identification and charging requirements and capabilities, the sending, from the charging station, a challenge to the vehicle; or the sending, from the charging station to the vehicle, a response to the challenge are performed within second timeslots of the duty cycle.

According to another aspect, the sending of the maximum allowed charging current indicator from the charging station to the vehicle within the first timeslots of the duty cycle is limited by an upper bound of the duty cycle.

According to another aspect, the exchanging, between the vehicle and the charging station, information related to identification and charging requirements and capabilities, the sending, from the charging station, a challenge to the vehicle; or the sending, from the charging station to the vehicle, a response to the challenge within the second timeslots of the duty cycle are not limited by the upper bound of the duty cycle.

According to another aspect, the sending, from one of the charging station and the vehicle, a challenge to the other one of the charging station and the vehicle includes sending, from one of the charging station and the vehicle, a new challenge only once each time a vehicle is connected to the charging station.

According to another aspect, the exchanging, between the vehicle and the charging station, information related to identification and charging requirements and capabilities, the sending, from one of the charging station and the vehicle, a challenge to the other one of the charging station and the vehicle; the sending, from the other one of the charging station and the vehicle to the one of the charging station and the vehicle, a response to the challenge are completed prior to completion of charging of the vehicle.

According to another aspect, the method further includes sending, from the charging station to a remote back office, information collected during charging of the vehicle, and corroborating information collected during charging of the vehicle.

According to several aspects of the present disclosure, a vehicle charging station includes a connector adapted to connect a vehicle to the charging station, the charging station adapted to exchange information related to identification and charging requirements and capabilities, send a challenge to the vehicle, receive a response to the challenge from the vehicle, verify the response from the vehicle and store the response and identification information within a database, and wherein, the exchanging of information between the vehicle and the charging station is performed within allowed duty cycle durations and voltage levels such that the exchange of information between the vehicle and the charging station does not interfere with charging of the vehicle.

According to another aspect, the charging station is adapted to exchange of information between the vehicle and the charging station over analog signals.

According to another aspect, the charging station is adapted to exchange information between the vehicle and the charging station within a multi-level duty cycle that supports communication between the vehicle and the charging station.

According to another aspect, the duty cycle is at least 10% and does not exceed 50%.

According to another aspect, the duty cycle includes alternating first and second timeslots, wherein, the maximum allowed charging current indicator from the charging station to the vehicle is sent within first timeslots of the duty cycle, and wherein, information is exchanged between the vehicle and the charging station within second timeslots of the duty cycle.

According to another aspect, the maximum allowed charging current indicator sent from the charging station to the vehicle within the first timeslots of the duty cycle is limited by an upper bound of the duty cycle, and the information exchanged between the vehicle and the charging station within the second timeslots of the duty cycle are not limited by the upper bound of the duty cycle.

According to another aspect, the charging station is adapted to send a new challenge to the vehicle and receive a response from the vehicle once each time the vehicle is connected to the charging station.

According to another aspect, wherein the charging station is further adapted to send information exchanged with the vehicle to a remote back office.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
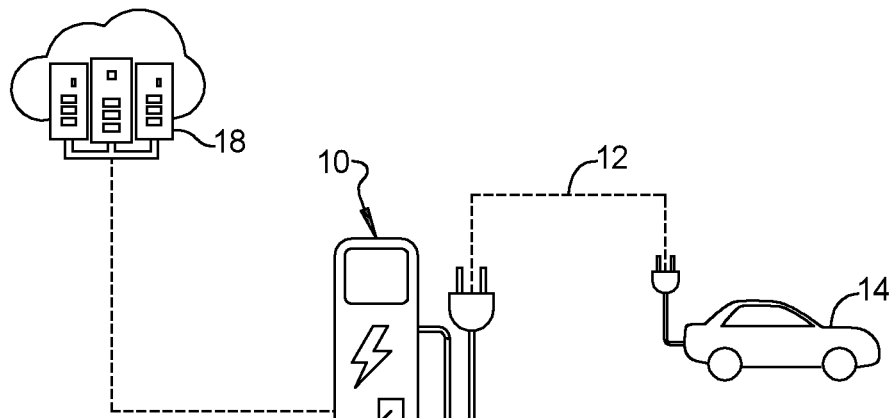
FIG. 1 is a schematic view of a charging system according to an exemplary embodiment connected to a vehicle.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" applies to electric vehicles fully powered by electric motors or to hybrid vehicles having supplemental electric power sources in combination with conventional vehicle power systems such as internal combustion engines, etc. It should be understood by those skilled in the art that the method and apparatus of the present disclosure is applicable to any vehicle that includes components of an electrified propulsion system and power storage devices, such as batteries, that would require periodic re-charging.

Referring to FIG. 1 a vehicle charging station 10 in accordance with the present disclosure includes a connector 12 adapted to connect a vehicle 14 to the charging station 10. When the charging station 10 is connected to the vehicle 14, the charging station 10 is adapted to exchange information related to identification and charging requirements and capabilities between the charging station 10 and the vehicle 14.

Manufacturers of vehicles equipped with electric propulsion systems promote the use of their own branded charging stations. This allows the manufacturers to ensure that their vehicles are being charged by charging stations having good quality and suited to charge their vehicles, thus improving the health and longevity of the batteries in such vehicles. To promote the use of their own branded charging stations, manufacturers may offer extended battery warranties and discounts on charging services. Thus, the charging station 10 is adapted to exchange information with the connected vehicle 14 to obtain information related to the identify/brand of the vehicle 14 as well as ensuring that the charging station 10 meets the charging requirements of the vehicle 14.

To ensure information exchanged between the vehicle 14 and the charging station 10 is not intercepted and replayed by an unauthorized third party, as is the case with static IDs, either the charging station 10 or the vehicle 14 implements a challenge/response protocol, wherein, for example, the charging station 10 sends a random challenge to the vehicle 14. The charging station 10 receives a response to the random challenge from the vehicle 14, wherein the vehicle 14 responds with a signature on the hash of the challenge and the vehicle 14 identification. Throughout the remainder of this description, the challenge/response protocol will be described with the charging station sending a challenge, and the vehicle sending a response, however, it should be understood that the challenge/response protocol may be reversed, wherein the challenge is sent by the vehicle and a response is sent by the charging station. For sufficient security, the challenge and response in the exchange protocol must be of sufficient size (currently, 128 bits or more) to deter hacking by a third party. To enable the verification of public key signatures, the vehicle 14 and the charging station 10 are provisioned with public key certificates by the manufacturer of the vehicle 14 and charging station 10.

Each of the vehicle 14 and the charging station 10 are equipped with the capability to securely store the public key of the certificate authority (manufacturer of the vehicle/charging station) and the private key of their own public key certificate. Further systems within the vehicle 14 and the charging station 10 have the capability to securely run a signature generation algorithm without exposing the private key and to securely run a signature verification algorithm and store the verification result. The vehicle 14 is equipped with a vehicle integration control module which controls systems and sub-systems within the vehicle 14 and controls sending and receiving data from the charging station 10. The charging station 10 is equipped with a control module 16 that includes capability to control the functions of the charging station 10 and controls sending and receiving data from connected vehicles 14 as well as communications with remote back-office systems 18. Upon receipt, the charging station 10 is adapted to verify the response from the vehicle 14, and, if the response is valid, to store the response and the vehicle identification information within a database 20.

The control module 16 within the charging station is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Upon connection to the vehicle 14, the charging station 10 is adapted to send charging current from the charging station 10 to the vehicle 14 to charge the power storage devices, such as batteries, within the vehicle 14. The communication between the vehicle 14 and the charging station 10, via the connector 12, including exchanging information related to identity of the vehicle 14 and the challenge/response protocol is carried over analog signals. To ensure that communications between the vehicle 14 and the charging station 10 do not interfere with the charging of the vehicle 14, the exchange of information between the vehicle 14 and the charging station 10 is performed within allowed current duty cycle and voltage intervals.

Figure 2A:
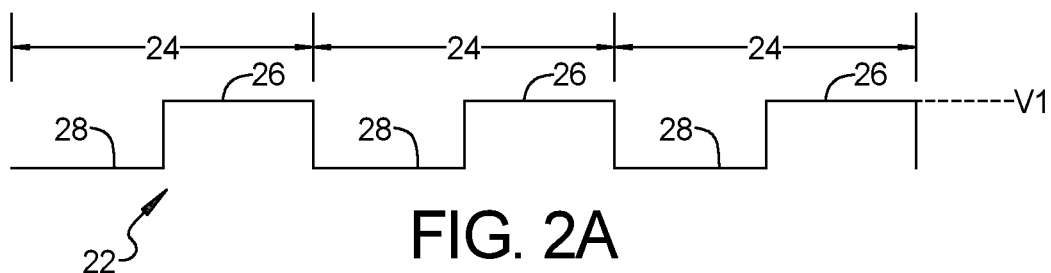
FIG. 2A is a schematic diagram of an analog signal having a duty cycle of 50%.
Figure 2B:
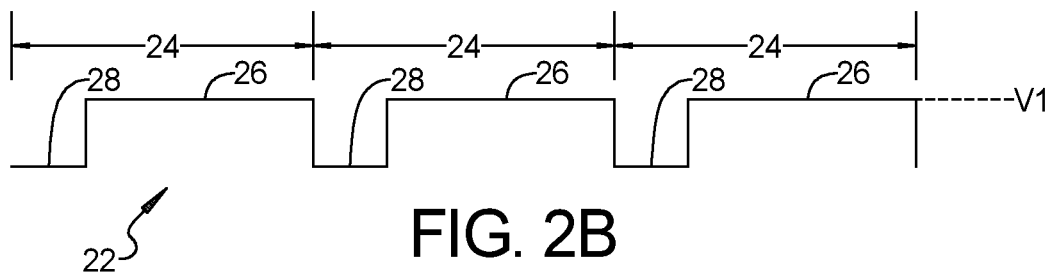
FIG. 2B is a schematic diagram of an analog signal having a duty cycle of 75%.
Figure 2C:
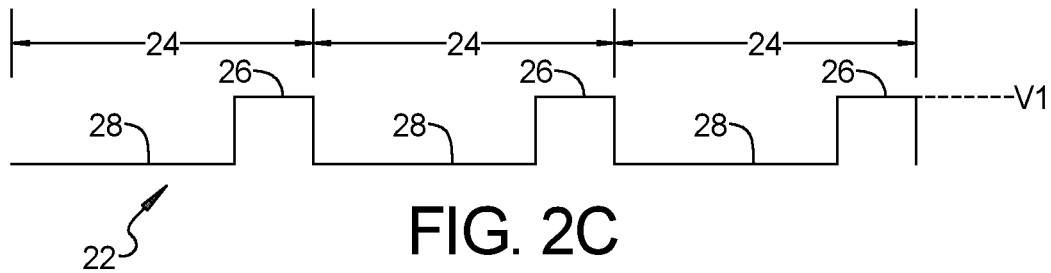
FIG. 2C is a schematic diagram of an analog signal having a duty cycle of 25%.

The duty cycle is the portion of time that an analog signal 22 is active or "on". Referring to FIG. 2, the duty cycle is represented by a square wave form, wherein during a cycle 24, the signal is "on" during a first portion 26 of a cycle 24, and the signal is "off" or inactive during a second portion 28 of the cycle 24. As shown in FIG. 2A, a 50% duty cycle means that the signal 22 is on for 50% of the cycle 22 and off for 50% of the cycle 22. Referring to FIG. 2B, a 75% duty cycle means that the signal 22 is on for 75% of the cycle 22, and off for 25% of the cycle 22, and referring to FIG. 2C, a 25% duty cycle means that the signal 22 is on for 25% of the cycle 22 and off for 75% of the cycle 22. The duty cycle is tailored to the configuration of the charging station 10 and there should be direct one-to-one mapping of the duty cycle to the maximum current that can be provided by the charging station 10.

Referring again to FIG. 2A, in a two-level voltage based analog communication, during the duty cycle the signal 22 is on at a voltage level V1, and off at zero voltage. A two-level voltage based analog signal 22 is limited in the amount of binary information that may be transferred. It is important to maximize the amount of information exchanged between the vehicle 14 and the charging station 10 and to ensure that the communication exchange between the vehicle 14 and the charging station 10 does not interfere with the charging of the vehicle 14.

Figure 3:
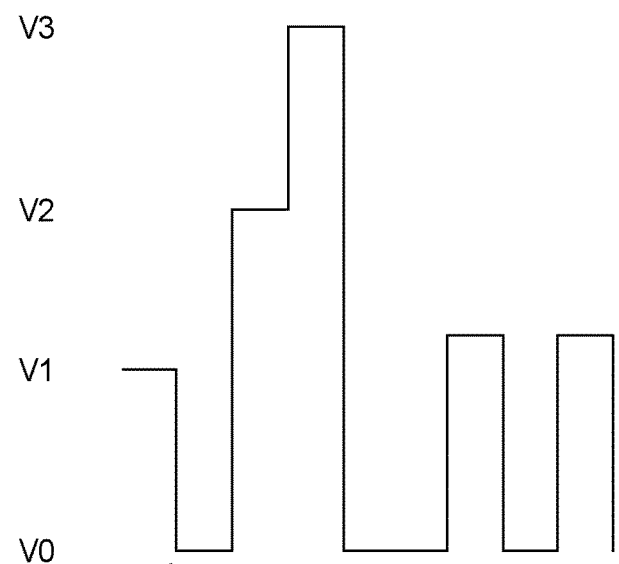
FIG. 3 is a schematic diagram of a four level analog signal.

In an exemplary embodiment, to shorten the duration of the challenge/response protocol interaction, the charging station 10 is adapted to exchange information between the vehicle 14 and the charging station 10 and send the maximum allowed charging current indicator from the charging station 10 to the vehicle 14 within a variable duration duty cycle that supports both communication between the vehicle 14 and the charging station 10. The vehicle 14 uses a multi-level voltage to transfer information to the charging station 10. The charging station 10 uses a variable duration duty cycle to send information to the vehicle 14. In either direction, the more duty cycle durations or voltage levels the sender (either the charging station 10 or the vehicle 14) uses, the more information that can be encoded within each message and the faster the identification protocol can be completed. Referring to FIG. 3, a four-level voltage based analog signal 30 is shown, wherein the duty cycle of the signal includes four different voltages, V0, V1, V2, V3. A four-level voltage based analog signal 30 increases the signal bandwidth, and thus, the amount of information that can be transferred, thus reducing the length of time needed to transfer a given amount of information.

A four-level voltage-based analog signal 30 can be used to encode 2 bits of binary information, 00, 01, 11, 10. Communications from the vehicle 14 to the charging station 10 use a multi-level voltage-based analog signal 30. Similarly, a variable duration duty cycle can be used to encode a number of bits per message depending on the number of pulse widths used.

Communications from the charging station 10 to the vehicle 14 use variable duty cycle durations. Both communications from the vehicle 14 to the charging station 10 and from the charging station 10 to the vehicle 14 are carried on the same wire, which is called a "control pilot". Since the duty cycle is also used to convey the max amount of current that can be drawn, duty cycle signals used by the charging station 10 in the identification protocol should not have a duty cycle that exceeds the value corresponding to the maximum supported current. For example, according to charging standards, a 30 amp charging station 10 shall not exceed a duty cycle of 50%, and shall not be equal to 5% (because a 5% duty cycle indicated a digital channel, not analog). Hence, for this example, to ensure communication from the charging station to the vehicle does not interfere with the charging process, the current duty cycle used for communication can safely be in the interval [10%, 50%]. If we assume the vehicle 14 and the charging station 10 have 2.5% duty cycle resolution, a sixteen-level voltage-based duty cycle can encode up to 4 bits of data. Assuming a [1khz] 1 kHz clock, to transfer a 128-bit challenge or response @ 4 bits per millisecond, the transfer would take 32 milliseconds. The boundaries of the multi-level duty cycle and respective voltages can be chosen to maximize the bandwidth of communications between the vehicle 14 and the charging station 10 without interfering with the charging process.

Figure 4:
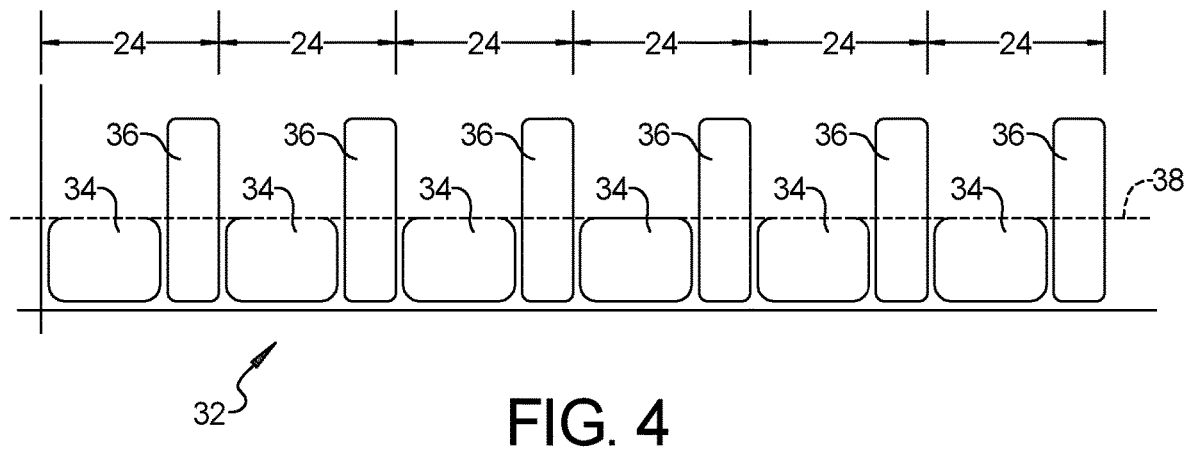
FIG. 4 is a schematic diagram of a time-multiplexed analog signal having first and second timeslots.

In another exemplary embodiment, an analog signal duty cycle 32 includes alternating first and second timeslots 34, 36 to take advantage of time-division multiplexing of the analog signal 32. Referring to FIG. 4, the maximum allowed charging current indicator from the charging station 10 to the vehicle 14 is sent within first timeslots 34 of each cycle 24, and information is exchanged between the vehicle 14 and the charging station 10 within second timeslots 36 of each cycle 24.

The maximum allowed charging current indicator sent from the charging station 10 to the vehicle 14 within the first timeslots 34 of the duty cycle is limited by an upper bound 38 of the duty cycle. However, the information exchanged between the vehicle 14 and the charging station 10 within the second timeslots 36 of the duty cycle are not limited by the upper bound 38 of the duty cycle. Thus, there is more bandwidth available for communication between the vehicle 14 and the charging station 10. This is advantageous because increased bandwidth allows more information to be sent in a shorter time-period, which reduces the likelihood that the communications will interfere with the charging of the vehicle 14. In an exemplary embodiment, the second timeslots 36 are less than 3 seconds long, wherein the increased bandwidth allows required data to be transferred within that amount of time.

In an exemplary embodiment, the charging station 10 is adapted to send a new random challenge to the vehicle 14 and receive a response from the vehicle 14 once each time a vehicle 14 is connected to the charging station 10. This helps prevent potential attackers from using vehicles 14 and charging stations 10 as oracles to get valid challenge/response pairs. Oracle attacks provide an attacker with a mechanism to obtain valid challenge/response pairs, which can then be used to infer information about secret keys or get closer to bypassing the security of the system. A new random challenge is issued for each new session (when vehicle 14 is connected to the charging station 10). Further, one, and only one challenge/response protocol will be initiated per charging session. To initiate a new challenge the vehicle 14 must be disconnected from the charging station 10 and then re-connected. This makes oracle attacks non-scalable and time consuming.

In another exemplary embodiment, the charging station 10 is further adapted to send information exchanged with the vehicle 14 to a remote back office 18. Each time the charging station 10 verifies the identity of a vehicle 14 that has connected, the information is stored within a database 20 within the charging station 10. Periodically, the charging station 10 sends such information to the remote back office 18 that is maintained by the manufacturer of the vehicle 14/charging station 10 so the information can be corroborated with information gathered by the manufacturer directly from vehicles 14. This allows the manufacturer to verify when their vehicles 14 use their charging stations 10, wherein, the manufacture can provide rewards, discounts, etc. for vehicles 14 that use their charging stations 10.

The charging station 10 includes a wireless communication module located within the control module 16 that is adapted to allow wireless communication between the charging station 10 and the remote back office 18. Typically, the vehicle 14, will also communicate wirelessly with the back office and cloud-based databases as well. The wireless communication module communicates with the remote back office 18 via a wireless data communication network over wireless communication channels such as a WLAN, 4G/LTE or 5G network, or the like. Such databases can be communicated with directly via the internet, or may be cloud-based databases.

Verification of the identity of the vehicle 14 is not necessarily a prerequisite for charging to begin. Charging can begin as soon as the vehicle 14 is connected to the charging station 10. Completion of the challenge/response protocol and verification of the identity of the vehicle 14 is only required to be completed by the time charging of the vehicle 14 is complete, and only for the purpose of verifying brand loyalty for rewards, etc. However, in some circumstances, verification may be a prerequisite for charging to begin for purposes of payment or reservations.

Figure 5:
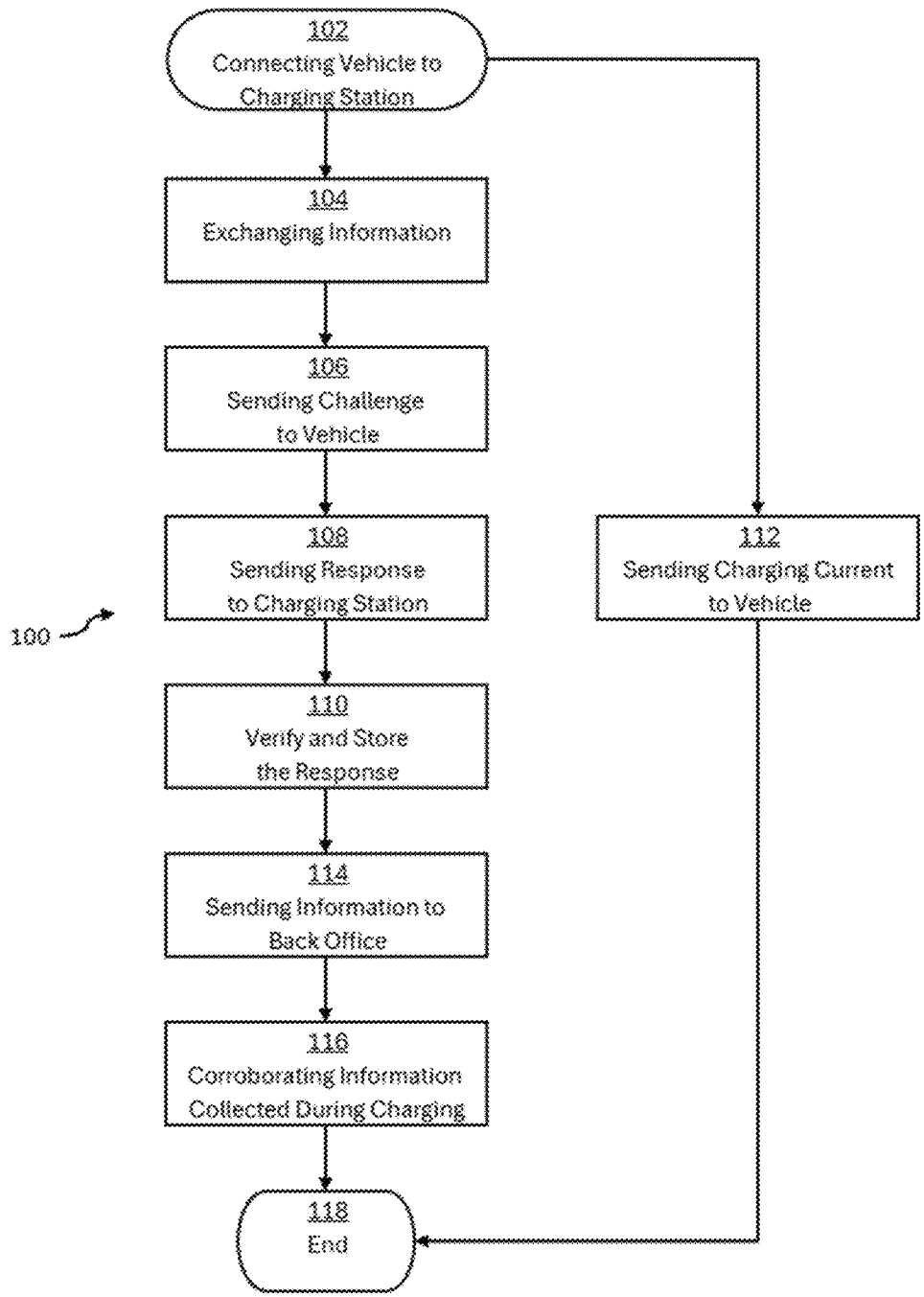
FIG. 5 is a schematic flow chart illustrating a method according to an exemplary embodiment.

Referring to FIG. 5, a method 100 of communication between a vehicle 14 and a charging station 10 includes, starting at block 102, connecting the vehicle 14 to the charging station 10, and moving to block 104, exchanging, between the vehicle 14 and the charging station 10, information related to identification and charging requirements and capabilities. Moving to block 106, the method 100 further includes sending, from the charging station 10, a challenge to the vehicle 14, and moving to block 108, sending, from the vehicle 14 to the charging station 10, a response to the challenge. Moving to block 110, the method 100 includes verifying, at the charging station 10, the response from the vehicle 14 and storing the response and the vehicle identification information within a database 20. The vehicle 14 may also store the response and the charging station 10 identification in a database.

Moving from block 102, to block 112, the method 100 further includes sending charging current from the charging station to the vehicle to charge batteries within the vehicle. The exchanging, between the vehicle 14 and the charging station 10, information related to identification and charging requirements and capabilities at block 104, the sending, from the charging station 10, a challenge to the vehicle 14 at block 106, and the sending, from the vehicle 14 to the charging station 10, a response to the challenge at block 108 are performed within allowed duty cycle duration and voltage levels such that the exchanging, between the vehicle 14 and the charging station 10, information related to identification and charging requirements and capabilities at block 104, the sending, from the charging station 10, a challenge to the vehicle 14 at block 106, and the sending, from the vehicle 14 to the charging station 10, a response to the challenge at block 108 do not interfere with charging of the vehicle 14 at block 112.

In an exemplary embodiment, the exchanging, between the vehicle 14 and the charging station 10, information related to identification and charging requirements and capabilities at block 104, the sending, from the charging station 10, a challenge to the vehicle 14 at block 106, the sending, from the vehicle 14 to the charging station 10, a response to the challenge at block 108, are performed over analog signals 22, and then communication returns to the normal operation of the analog signals.

In another exemplary embodiment, the exchanging, between the vehicle 14 and the charging station 10, information related to identification and charging requirements and capabilities at block 104, the sending, from the charging station 10, a challenge to the vehicle 14 at block 106, the sending, from the vehicle 14 to the charging station 10, a response to the challenge at block 108, are performed within a multi-duration duty cycle 32 and multi-level voltage on an analog signal that supports communication between the vehicle 14 and the charging station 10.

In another exemplary embodiment, the exchanging, between the vehicle 14 and the charging station 10, information related to identification and charging requirements and capabilities at block 104, the sending, from the charging station 10, a challenge to the vehicle 14 at block 106, the sending, from the vehicle 14 to the charging station 10, a response to the challenge at block 108, are performed within a duty cycle that is at least 10% and does not exceed 50%.

In another exemplary embodiment, the duty cycle includes alternating first and second timeslots 34, 36, wherein, the sending of the maximum allowed charging current indicator from the charging station 10 to the vehicle 14 at block 112 is performed within first timeslots 34 of the duty cycle, and wherein, the exchanging, between the vehicle 14 and the charging station 10, information related to identification and charging requirements and capabilities at block 104, the sending, from the charging station 10, a challenge to the vehicle 14 at block 106, and the sending, from the vehicle 14 to the charging station 10, a response to the challenge at block 108 are performed within second timeslots 36 of the duty cycle.

The sending of the maximum allowed charging current indicator from the charging station 10 to the vehicle 14 at block 112 within the first timeslots 34 of the duty cycle is limited by an upper bound 38 of the duty cycle, and the exchanging, between the vehicle 14 and the charging station 10, information related to identification and charging requirements and capabilities at block 104, the sending, from the charging station 10, a challenge to the vehicle 14 at block 106, and the sending, from the vehicle 14 to the charging station 10, a response to the challenge at block 108 within the second timeslots 36 of the duty cycle are not limited by the upper bound 38 of the duty cycle duration.

In another exemplary embodiment, the sending, from the charging station 10, a challenge to the vehicle 14 at block 106 further includes sending, from the charging station 10, a new challenge only once each time a vehicle 14 is connected to the charging station 10.

In another exemplary embodiment, the exchanging, between the vehicle 14 and the charging station 10, information related to identification and charging requirements and capabilities at block 104, the sending, from the charging station 10, a challenge to the vehicle 14 at block 106, and the sending, from the vehicle 14 to the charging station 10, a response to the challenge at block 108 are completed prior to completion of charging of the vehicle 14 at block 112.

Moving from block 110 to block 114, in an exemplary embodiment the method 100 further includes sending, from the charging station 10 to a remote back office 18, information collected during charging of the vehicle 14, and moving to block 116, corroborating information collected during charging of the vehicle 14. Moving from either block 116 or block 112, the method 100 proceeds to block 118, wherein the method 100 ends.

A method 100 and charging station 10 of the present disclosure offers several advantages. These include facilitating communication between a vehicle 14 and a charging station 10 over analog signals 22 using equipment that is existing and already in place. Such communications not interfering with the charging process and providing the added security of preventing oracle attacks on charging stations 10.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of communication between a vehicle and a charging station, comprising:
   connecting the vehicle to the charging station;
   exchanging, between the vehicle and the charging station, information related to identification and charging requirements and capabilities;
   sending, from one of the charging station and the vehicle, a challenge to the other one of the charging station and the vehicle;
   sending, from the other one of the charging station and the vehicle to one of the charging station and the vehicle, a response to the challenge;
   verifying, at one of the charging station and the vehicle, the response and storing the response and the vehicle identification information and the charging station information within a database; and
   wherein, the exchanging, between the vehicle and the charging station, information related to identification and charging requirements and capabilities, the sending, from the charging station, a challenge to the vehicle, and the sending, from the vehicle to the charging station, a response to the challenge are performed within allowed duty cycle durations and voltage levels such that the exchanging, between the vehicle and the charging station, information related to identification and charging requirements and capabilities, the sending, from the charging station, a challenge to the vehicle, and the sending, from the vehicle to the charging station, a response to the challenge do not interfere with charging of the vehicle.

2. The method of claim 1, wherein the exchanging, between the vehicle and the charging station, information related to identification and charging requirements and capabilities, the sending, from one of the charging station and the vehicle, a challenge to the other one of the charging station and the vehicle; the sending, from the other one of the charging station and the vehicle to the one of the charging station and the vehicle, a response to the challenge are performed over analog signals and then communication returns to normal operation of the analog signals.

3. The method of claim 2, wherein the exchanging, between the vehicle and the charging station, information related to identification and charging requirements and capabilities, the sending, from one of the charging station and the vehicle, a challenge to the other one of the charging station and the vehicle; the sending, from the other one of the charging station and the vehicle to the one of the charging station and the vehicle, a response to the challenge, are performed within a multi-duration duty cycle that supports communication from the charging station to the vehicle and are performed within a multi-level voltage from the vehicle to the charging station.

4. The method of claim 3, wherein the exchanging, between the vehicle and the charging station, information related to identification and charging requirements and capabilities, the sending, from one of the charging station and the vehicle, a challenge to the other one of the charging station and the vehicle; the sending, from the other one of the charging station and the vehicle to the one of the charging station and the vehicle, a response to the challenge, and the sending of the maximum allowed charging current indicator from the charging station to the vehicle are performed within a duty cycle that is at least 10% and does not exceed 50%.

5. The method of claim 3, wherein the duty cycle includes alternating first and second timeslots;
wherein, the sending of the maximum allowed charging current indicator from the charging station to the vehicle is performed within first timeslots of the duty cycle; and
wherein, the exchanging, between the vehicle and the charging station, information related to identification and charging requirements and capabilities, the sending, from the charging station, a challenge to the vehicle; or the sending, from the charging station to the vehicle, a response to the challenge are performed within second timeslots of the duty cycle.

6. The method of claim 5, wherein the sending of the maximum allowed charging current indicator from the charging station to the vehicle within the first timeslots of the duty cycle is limited by an upper bound of the duty cycle.

7. The method of claim 6, wherein, the exchanging, between the vehicle and the charging station, information related to identification and charging requirements and capabilities, the sending, from the charging station, a challenge to the vehicle; or the sending, from the charging station to the vehicle, a response to the challenge within the second timeslots of the duty cycle are not limited by the upper bound of the duty cycle.

8. The method of claim 2, wherein the sending, from one of the charging station and the vehicle, a challenge to the other one of the charging station and the vehicle includes sending, from one of the charging station and the vehicle, a new challenge only once each time a vehicle is connected to the charging station.

9. The method of claim 2, wherein the exchanging, between the vehicle and the charging station, information related to identification and charging requirements and capabilities, the sending, from one of the charging station and the vehicle, a challenge to the other one of the charging station and the vehicle; the sending, from the other one of the charging station and the vehicle to the one of the charging station and the vehicle, a response to the challenge are completed prior to completion of charging of the vehicle.

10. The method of claim 2 further including:
sending, from the charging station to a remote back office, information collected during charging of the vehicle; and
corroborating information collected during charging of the vehicle.

11. A vehicle charging station, comprising:
a connector adapted to connect a vehicle to the charging station;
the charging station adapted to:
exchange information related to identification and charging requirements and capabilities;
send a challenge to the vehicle;
receive a response to the challenge from the vehicle;
verify the response from the vehicle and store the response and identification information within a database; and
wherein, the exchanging of information between the vehicle and the charging station is performed within allowed duty cycle durations and voltage levels such that the exchange of information between the vehicle and the charging station does not interfere with charging of the vehicle.

12. The charging station of claim 11, wherein the charging station is adapted to exchange of information between the vehicle and the charging station over analog signals.

13. The charging station of claim 12 wherein the charging station is adapted to exchange information between the vehicle and the charging station within a multi-level duty cycle that supports communication between the vehicle and the charging station.

14. The charging station of claim 13, wherein the duty cycle is at least 10% and does not exceed 50%.

15. The charging station of claim 13, wherein the duty cycle includes alternating first and second timeslots;
wherein, the maximum allowed charging current indicator from the charging station to the vehicle is sent within first timeslots of the duty cycle; and
wherein, information is exchanged between the vehicle and the charging station within second timeslots of the duty cycle.

16. The charging station of claim 15, wherein the maximum allowed charging current indicator sent from the charging station to the vehicle within the first timeslots of the duty cycle is limited by an upper bound of the duty cycle, and the information exchanged between the vehicle and the charging station within the second timeslots of the duty cycle are not limited by the upper bound of the duty cycle.

17. The charging station of claim 12, wherein the charging station is adapted to send a new challenge to the vehicle and receive a response from the vehicle once each time the vehicle is connected to the charging station.

18. The charging station of claim 12, wherein the charging station is further adapted to send information exchanged with the vehicle to a remote back office.

19. A method of communication between a vehicle and a charging station, comprising:
connecting the vehicle to the charging station with a connector adapted to facilitate analog communication between the vehicle and the charging station and to carry charging current from the charging station to the vehicle;
exchanging, between the vehicle and the charging station, information related to identification and charging requirements and capabilities;

initiating a challenge/response protocol between the charging station and the vehicle only once each time the charging station is connected to the vehicle;

verifying the response to the challenge/response protocol and storing the response, the vehicle identification information and the charging station identification information within a database;

sending, from at least one of the charging station and the vehicle, to a remote back office, information collected during charging of the vehicle; and corroborating information collected during charging of the vehicle; and wherein, the exchanging, between the vehicle and the charging station, information related to identification and charging requirements and capabilities, the challenge/response protocol including supporting communication from the charging station to the vehicle within a variable duration duty cycle and supporting communications from the vehicle to the charging station within a multi-level voltage within allowed duty cycle and voltage intervals such that the exchanging, between the vehicle and the charging station, information related to identification and charging requirements and capabilities, the sending, from the charging station, a challenge to the vehicle, and the sending, from the vehicle to the charging station, a response to the challenge do not interfere with charging of the vehicle.

20. The method of claim 19, wherein the duty cycle includes alternating first and second timeslots;

wherein, the sending of the maximum allowed charging current indicator from the charging station to the vehicle is performed within first timeslots of the duty cycle and is limited by an upper bound of the duty cycle; and wherein, the exchanging, between the vehicle and the charging station, information related to identification and charging requirements and capabilities, the sending, from the charging station, a challenge to the vehicle, and the sending, from the vehicle to the charging station, a response to the challenge are performed within second timeslots of the duty cycle and are not limited by the upper bound of the duty cycle.

* * * * *